(12) United States Patent
Meadowcroft

(10) Patent No.: US 7,400,831 B2
(45) Date of Patent: Jul. 15, 2008

(54) METHOD OF DETECTING THE PRESENCE OF CROSS-TALK AND APPARATUS THEREFOR

(75) Inventor: Simon Meadowcroft, Stowmarket (GB)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 685 days.

(21) Appl. No.: 10/459,590

(22) Filed: Jun. 12, 2003

(65) Prior Publication Data

US 2003/0231883 A1 Dec. 18, 2003

(30) Foreign Application Priority Data

Jun. 12, 2002 (EP) ................... 02254070

(51) Int. Cl.
*H04K 3/00* (2006.01)
*H04B 10/08* (2006.01)
*H04B 10/00* (2006.01)

(52) U.S. Cl. ..................... 398/39; 398/33; 398/159

(58) Field of Classification Search ............. 398/158, 398/159, 147, 26, 36, 33, 31, 39
See application file for complete search history.

(56) References Cited

U.S. PATENT DOCUMENTS 3,964,032 A * 6/1976 Bardos ................. 365/125
5,446,572 A 8/1995 Husbands et al. ........ 359/133
2002/0186428 A1* 12/2002 Saleheen ................ 359/110

FOREIGN PATENT DOCUMENTS

EP 0 984 580 A2 8/1999
EP 1 182 809 A2 4/2001

* cited by examiner

*Primary Examiner*—M. R. Sedighian

(57) ABSTRACT

A control loop detects the presence of cross-talk between first, second and third adjacent amplitude modulated wavelength division modulated channels of an optical communications system. A receiver including a demultiplexer, such as an Arrayed Waveguide Grating (AWG), receives portions of the energy in the channels to derive first, second and third electrical signals that are respectively replicas of the modulation of the first, second and third channels. Wavelength drift of the carried frequencies of the channels in detected by comparing the three signals in an electronic combinatorial logic unit.

15 Claims, 3 Drawing Sheets

METHOD OF DETECTING THE PRESENCE OF CROSS-TALK AND APPARATUS THEREFOR

FIELD OF THE INVENTION

The present invention relates to a method of detection of cross-talk, for example of the type sometimes found between adjacent channels of a wavelength separation device, such as adjacent channels of an arrayed waveguide grating (AWG). The present invention also relates to an apparatus for the detection of cross-talk and a method of detecting cross-talk by using combinatorial logic for the detection of cross-talk.

BACKGROUND ART

In an optical communications system a wavelength division multiplexing (WDM) scheme can be employed. To this end, the optical communications system can comprise a demultiplexer, for example an AWG. The AWG comprises an input port for receiving a multiplexed optical signal comprising a number of wavelengths, each wavelength corresponding to a different communications channel. The AWG also comprises a plurality of output ports. The multiplexed optical signal is demultiplexed by the AWG, each communications channel being output by a different output port of the AWG.

Each of the different communications channels is separated from an adjacent communications channel by a predetermined channel spacing. The predetermined channel spacing is usually dictated by a technical standard relating to the WDM scheme employed. For example, the predetermined channel spacing presently specified by the International Telecommunication Union (ITU) is 100 GHz.

It is known that AWGs are susceptible to thermal variations that cause the optical energy of a first given channel at a first spatial position to encroach upon/drift into a second given channel at a second spatial position adjacent the first channel. The AWG is linear and so when shifting of the given channel to a second spatial position occurs within the AWG, such shifting occurs for all of the channels present.

As the predetermined channel spacing between adjacent channels decreases, the impact of wavelength drift between adjacent channels, i.e. cross-talk, increases.

In order to obviate cross-talk, fine temperature control of the AWG is necessary. Typically, a control loop is provided coupled to a thermoelectric cooler, the thermoelectric cooler being coupled to the AWG. In order to implement control, it is clearly necessary to monitor the temperature to provide a feedback signal. It is known to use a thermistor to provide such feedback of temperature of the AWG. However, using thermistors, it is difficult to control the temperature of the AWG to within less than one degree Celsius.

SUMMARY OF THE INVENTION

According to the first aspect of the present invention, there is provided a method of detecting the presence of cross-talk between adjacent channels in a communication system, the method comprising the steps of: receiving at least a portion of a first signal on a first channel; receiving at least a portion of a second signal on a second channel, the second channel being adjacent the first channel; and processing the at least portions of the first and second signals using combinatorial logic.

Preferably, the method further comprises the step of monitoring at least a portion of a third signal on a third channel so as to detect cross-talk on the third channel, the third channel also being adjacent the second channel, so as to enable determination of the direction of drift.

Preferably, the method further comprises the step of generating the first and the second and the third signals using a wavelength separating device.

Preferably, generating the portions of the first, second and third signals includes amplifying the portions of the first, second and third signals using an amplifier.

Preferably, the combinatorial logic step compares (1) the portions of the first and second signals, with (2) the portions of the second and third signals.

Preferably, the method includes the step of applying a mask, in the form of the second signal, to the portion of the first channel. Application of the mask results in a commonality signal indicative, at a given time, of any component of the first signal having the same logic level as the second signal.

More preferably, the commonality signal is compared with the second signal in order to determine the presence of the second signal in the commonality signal.

Preferably, the method includes controlling the temperature of a wavelength separating device by detecting the presence of cross-talk between adjacent channels.

According to a second aspect of the present invention, a cross-talk detection apparatus for a device comprises a first input corresponding to a first channel and a second input corresponding to a second channel, wherein the first channel is adjacent the second channel. A combinatorial logic unit coupled to the first and second inputs processes signals on the first and second channels so as to detect cross-talk between the first and second channels.

Preferably, the device is a wavelength separating device.

Preferably, the combinatorial logic unit comprises at least one logic gate that operates according to Boolean logic.

According to a third aspect of the present invention, a control loop circuit apparatus for detecting the presence of cross-talk between adjacent channels in a communication system comprises a receiver for at least a portion of a first signal on a first channel and at least a portion of a second signal on a second channel, wherein the second channel is adjacent the first channel. A combinatorial logic unit processes the portions of the first and second signals.

Preferably, the receiver arrangement is arranged to receive at least a portion of a third signal on a third channel oppositely adjacent the first channel. The combinatorial logic unit is arranged to process the portion of the second and third signals so as to detect cross-talk in the third signal and provide an indication of the direction of wavelength drift.

More preferably, the control loop apparatus further comprises a controller for a temperature of a wavelength separating device.

According to a fourth aspect of the present invention, a combinatorial logic detects cross-talk between a first channel and a second adjacent channel, the first channel being the second channel.

It is thus possible to provide an apparatus for and method of detecting wavelength drift having a more accurate feedback signal thereby facilitating temperature control to a degree of accuracy of less than one degree Celsius. Consequently, wavelength drift is largely obviated or at least mitigated.

BRIEF DESCRIPTION OF THE DRAWINGS

At least one embodiment of the present invention will now be described, by way of example only, with reference to the following drawings, in which.

Throughout the following description, identical reference numerals identify like parts.

DETAILED DESCRIPTION OF THE DRAWINGS

Figure 1:
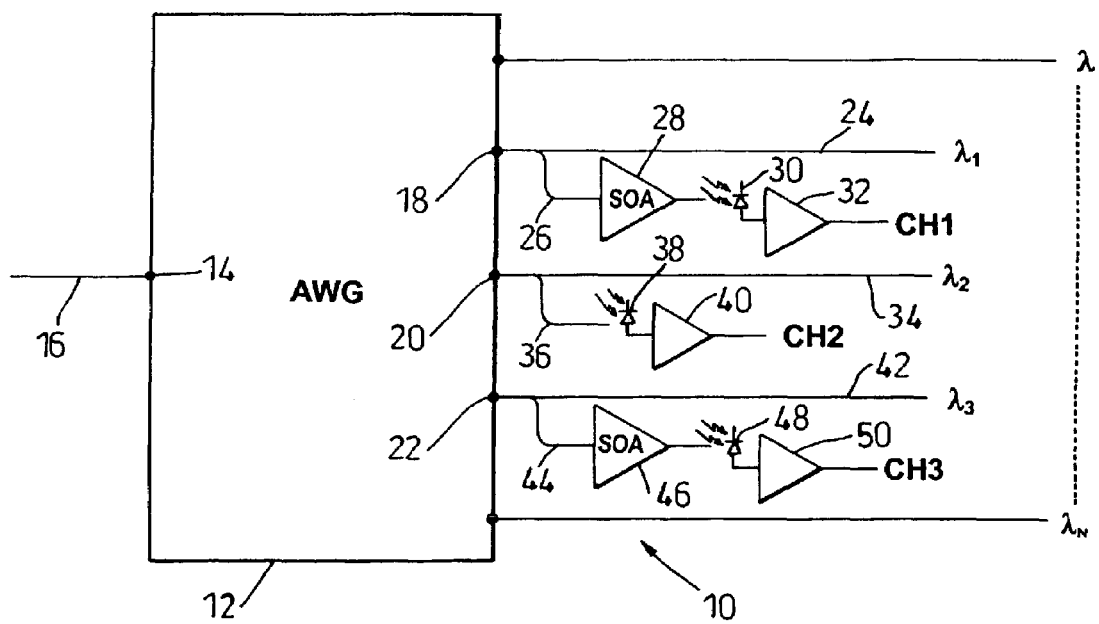
FIG. 1 is a schematic diagram of a demultiplexer including an AWG and apparatus to tap signals from the output of the AWG.

Referring to FIG. 1, in a communications system employing a WDM scheme a demultiplexer 10 is provided. The demultiplexer 10 comprises an AWG 12 having an input port 14 for receiving an input signal (not shown) via a first optical fibre 16 coupled to the input port 14. The input signal is a multiplexed signal comprising N channels respectively corresponding to N wavelengths ($\lambda_1, \ldots, \lambda_N$). The AWG 12 comprises N output ports corresponding to the N channels. In order to detect cross-talk between adjacent channels of the N channels, it is necessary to monitor at least two channels, but preferably three channels. In this example, for the sake of completeness, the monitoring of three channels is described, for example, a first channel CH1, a second channel CH2 and a third channel CH3 corresponding to a first output port 18, a second output port 20 and a third output port 22 respectively of the N output ports. Channels CH1, CH2, and CH3 are spatially arranged so channels CH1 and CH2 are adjacent and channels CH2 and CH3 are adjacent, so that channel CH2 is spatially between channels CH1 and CH3. The first channel CH1 corresponds to a first wavelength $\lambda_1$, the second channel CH2 corresponds to a second wavelength $\lambda_2$ and the third channel CH3 corresponds to a third wavelength $\lambda_3$, such that $\lambda_2$ is between $\lambda_1$ and $\lambda_3$. Wavelengths $\lambda_1$, and $\lambda_2$ are close enough that cross-talk can occur between them as the temperature of AWG 12 varies wavelengths $\lambda_2$ and $\lambda_3$.

A first end of a first output optical fibre 24 is coupled to the first output port 18. A first end of a first branch optical fibre 26 is coupled to the first output optical fibre 24 by means of, for example, a first 90/10 splitter (not shown). A second end of the first branch optical fibre 26 is coupled to an input port of a first Semiconductor Optical Amplifier (SOA) 28, the output of which is directed towards and in close proximity to a first photodetector arrangement comprising a first photodiode 30 coupled to a first amplifier circuit 32.

A first end of a second output optical fibre 34 is coupled to the second output port 20. A first end of a second branch optical fibre 36 is coupled to the second output optical fibre 34 by means of, for example, a second 90/10 splitter (not shown). A second end of the second branch optical fibre 36 is directed towards and in close proximity to a second photodetector arrangement comprising a second photodiode 38 coupled to a second amplifier circuit 40.

A first end of a third output optical fibre 42 is coupled to the third output port 22. A first end of a third branch optical fibre 44 is coupled to the third output optical fibre 42 by means of, for example, a third 90/10 splitter (not shown). A second end of the third branch optical fibre 44 is coupled to an input port of a second SOA 46, the output of which is directed towards and in close proximity to a third photodetector arrangement comprising a third photodiode 48 coupled to a third amplifier circuit 50. Although not shown, the ends of the first, second and third output optical fibres 24, 34, 42 are typically coupled to other optical fibres by means of optical connectors or splicing, thereby permitting onward propagation of optical signals, propagating through the first, second and third output optical fibres 24, 34, 42, through the communications system.

Figure 2:
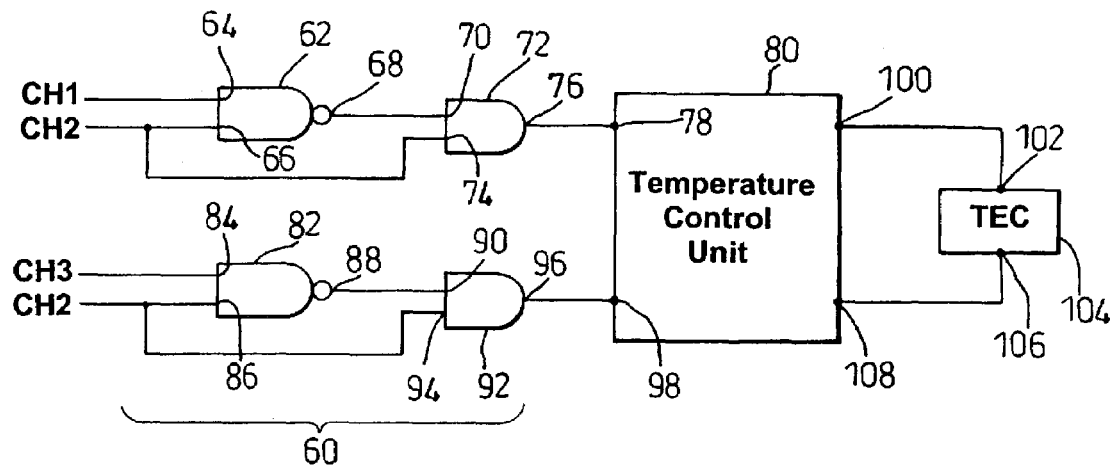
FIG. 2 is a schematic diagram of a first embodiment of the present invention.

Referring to FIG. 2, a combinatorial logic unit 60 is arranged as follows. A first NAND gate 62 is provided having a first input terminal 64 coupled to an output terminal of the first amplifier circuit 32. A second input terminal 66 of the first NAND gate 62 is coupled to an output terminal of the second amplifier circuit 40.

An inverting output terminal 68 of the first NAND gate 62 is coupled to a first input terminal 70 of a first AND gate 72. A second input terminal 74 of the first AND gate 72 is also coupled to the second input terminal 66 of the first NAND gate 62. An output terminal 76 of the first AND gate 72 is coupled to a first input terminal 78 of a Temperature Control Unit (TCU) 80.

A second NAND gate 82 comprises a first input terminal 84 coupled to an output terminal of the third amplifier circuit 50. A second input terminal 86 is also coupled to the output terminal of the second amplifier circuit 40. An inverting output terminal 88 of the second NAND gate 82 is coupled to a first input terminal 90 of a second AND gate 92. A second input terminal 94 of the second AND gate 92 is also coupled to the second input terminal 86 of the second NAND gate 82. An output terminal 96 of the second AND gate 92 is coupled to a second input terminal 98 of the TCU 80. The first NAND gate 62 and the first AND gate 72, the second NAND gate 82 and the second AND gate 92 together constitute the combinational logic unit 60.

The TCU 80 comprises a first output terminal 100 coupled to a first terminal 102 of a Thermoelectric Cooler (TEC) 104, for example a Peltier effect device, the TEC 104 being thermally coupled to the AWG 12. The TEC 104 comprises a second terminal 106 coupled to a second output terminal 108 of the TCU 80.

In operation, the input signal propagates through the optical fibre 16 to the input port 14 of the AWG 12. The AWG 12 spatially separates out the multiplexed signal into its component channels so as to respectively present the component channels to the first, second and third output ports 18, 20, 22 of the AWG 12.

A first optical output signal corresponding to the first channel CH1 propagates through the first output optical fibre 24. A portion of the first optical output signal is tapped by the first 90/10 splitter and propagates through the first branch optical fibre 26 to the first SOA 28. The first SOA 28 amplifies the portion of the first optical output signal and the amplified portion of the first optical output signal is incident upon the first photodetector arrangement whereupon the amplified portion of the first optical output signal is converted into a first voltage signal 'A'.

A second optical output signal corresponding to the second channel CH2 propagates through the second output optical fibre 34. A portion of the second optical output signal is tapped by the second 90/10 splitter and propagates through the second branch optical fibre 36 to be incident upon the second photodetector arrangement whereupon the portion of the second output optical signal is converted into a second voltage signal 'B'.

A third optical output signal corresponding to the third channel CH3 propagates through the third output optical fibre 42. A portion of the second optical output signal is tapped by the third 90/10 splitter and propagates through the third branch optical fibre 44 to the second SOA 46. The second SOA 46 amplifies the portion of the third output optical signal and the amplified portion of the third output optical signal is incident upon the third photodetector arrangement and converted into a third voltage signal "C". Due to the low amplitude of the presence of the second output optical signal on the first channel CH1 or third channel CH3 when wavelength drift occurs, it is necessary to amplify the weak component of the tapped portion of the first and third output optical signals in order to further process the tapped portion of the first and third output optical signals.

Figure 3A:
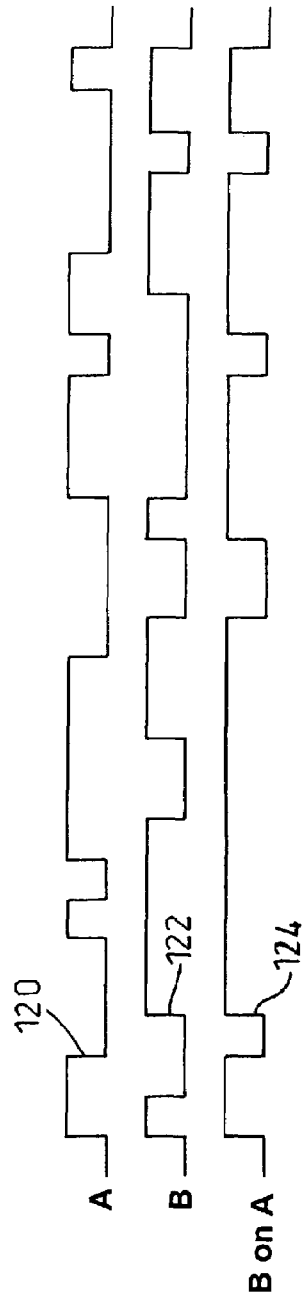
FIGS. 3a, 3b and 3c are timing diagrams applied to and generated by the apparatus of FIG. 2.

Referring to FIG. 3a, in the absence of cross-talk, the first voltage signal A is a first bit stream 120 and the second voltage signal B is a second bit stream 122.

Figure 3B:
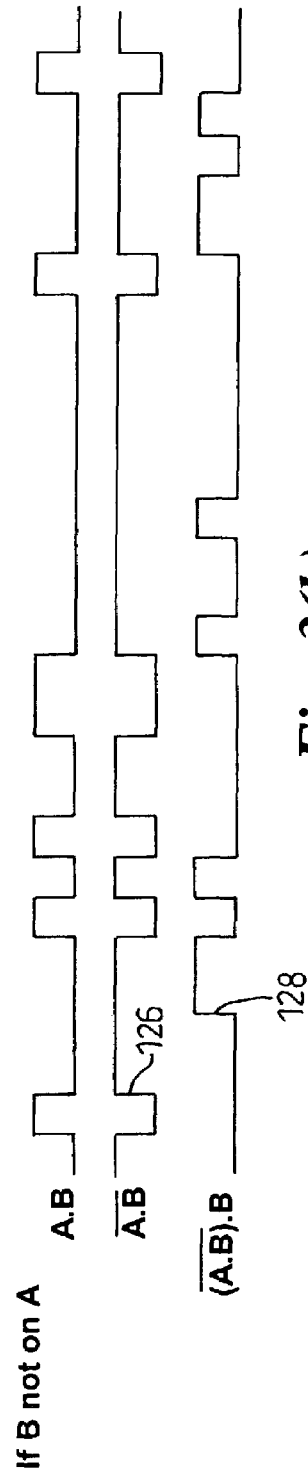

Referring to FIG. 3b, the first NAND gate 62 uses the second bit stream 122 as a mask in order to identify, at a given time, a bit of the first bit stream 120 that corresponds to a bit of the second bit stream 122. The resultant masking function is also inverted by the first NAND gate 62 resulting in the signal identified by the Boolean expression $\overline{A.B}$ (hereinafter referred to as a masked bit stream 126). The masked bit stream 126 and the second bit stream 122 are applied to the first AND gate 72, a logical AND operation being carried out on the masked bit stream 126 and the second bit stream 122 in order to ascertain whether the masked bit stream 126 corresponds to the second bit stream 122. The result of the logical AND operation is denoted in FIG. 3b by the Boolean expression $\overline{A.B}.B$ (hereinafter referred to as the verification bit stream 128).

The absence of LOGIC 1 bits over a predetermined period of time, for example up to 1 s, such as between 1 ms to 1 s, in the verification bit stream 128 generated by the first AND gate 72 is an indication of the presence of the second bit stream 122 on the first channel CH1, i.e. cross-talk.

Figure 3C:
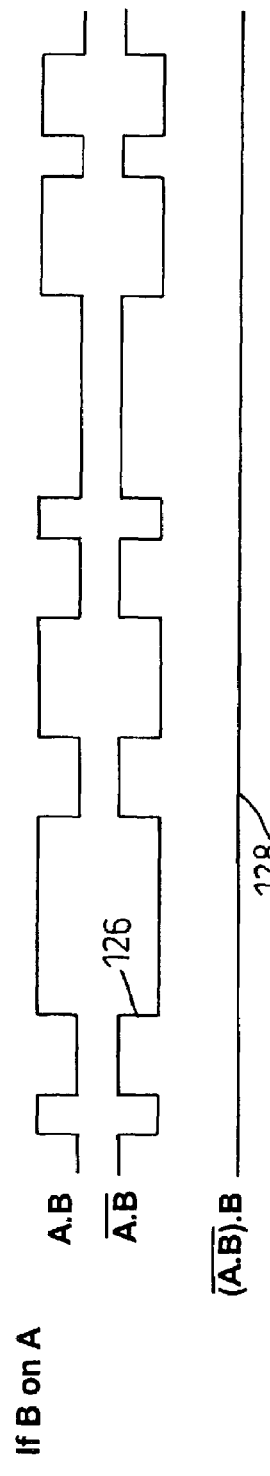

When cross-talk occurs between the first channel CH1 and the second channel CH2 the second bit stream 122 is combined with the first bit stream 120, corresponding to carrying out a logical OR operation on the first and second bit streams resulting in a third bit stream 124 on the first channel. In such circumstances the verification bit stream 128 only comprises LOGIC 0s over the predetermined period of time (FIG. 3c).

Since wavelength drift can occur in either direction, namely into the first channel CH1 or the third channel CH3, it is also necessary to monitor cross-talk in the third channel CH3. In order to monitor cross-talk in the third channel CH3, the second and third channels CH2 and CH3 respectively are processed by the second NAND gate 82 and the second AND gate 92 using the same logical operations described above in connection with the first channel CH1 and the second channel CH2. Consequently, the presence of a stream of LOGIC 0s at the first input terminal 78, or alternatively at the second input terminal 98, of the TCU 80 provides an indication of the direction of wavelength drift. In response to the indication of the direction of wavelength drift, the TCU 80 applies a voltage across the TEC 104 so as to initiate cooling or heating of the AWG 12 by the TEC 104 so as to reduce or increase the temperature of the AWG 12 and thus eliminate cross-talk.

Figure 4:
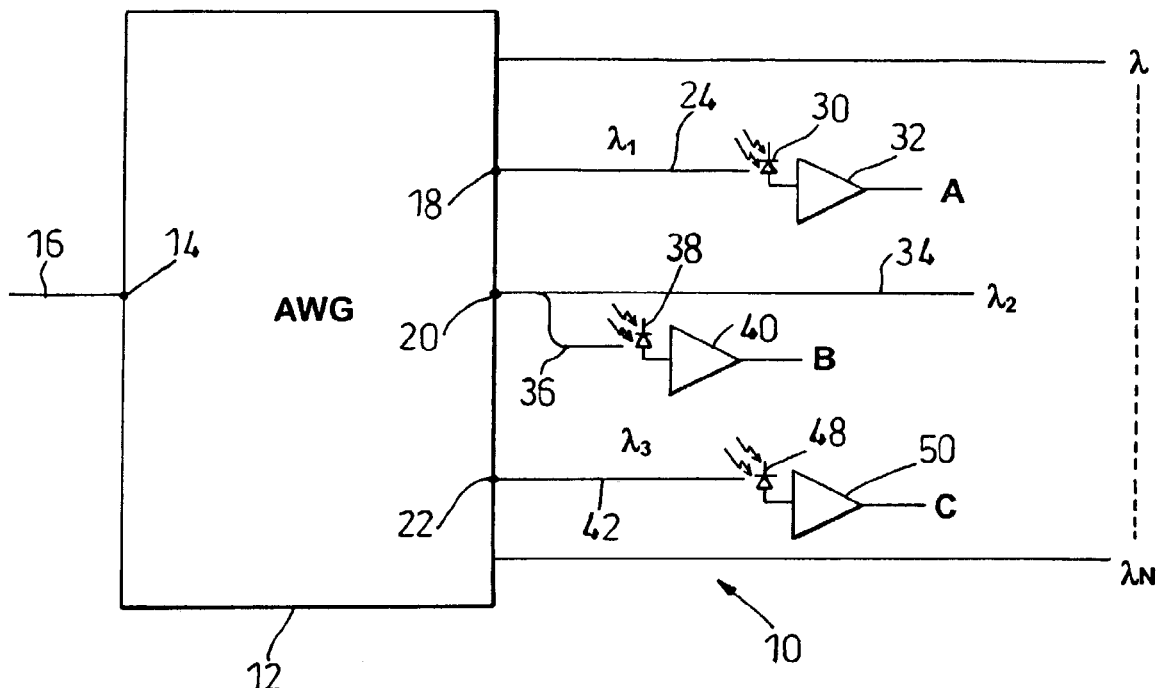
FIG. 4 is a schematic diagram of another demultiplexer including an AWG and apparatus to tap signals from the output of the AWG.

Referring to FIG. 4, the demultiplexer 10 is in an alternative configuration to FIG. 1 constituting the second embodiment of the present invention. The first SOA 28 and the first branch optical fibre 26 of FIG. 1 are absent, and the second end of the first output optical fibre 24 is directed towards and in close proximity to the first photodetector arrangement. Similarly, the second SOA 46 and the third branch optical fibre 44 of FIG. 1 are also absent, the second end of the third output optical fibre 42 being directed towards and in close proximity to the third photodetector arrangement. The coupling of the second photodetector arrangement with respect to the second channel CH2 is as described above in connection with FIG. 1.

Figure 5:
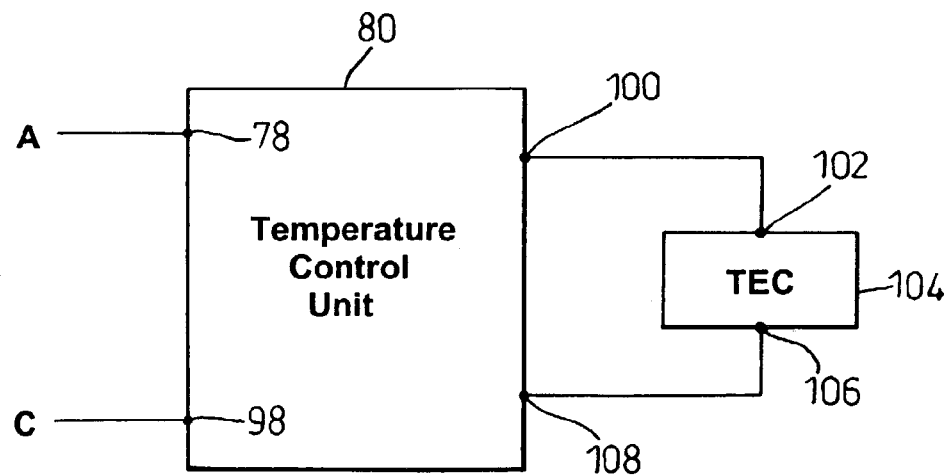
FIG. 5 is a schematic diagram of a second apparatus for use with the demultiplexer of FIG. 4, and constitutes a second embodiment of the present invention.

Referring to FIG. 5, the first input terminal 78 of the TCU 80 is coupled to the output terminal of the first amplifier circuit 32. The second input terminal 98 of the TCU 80 is coupled to the output terminal of the third amplifier circuit 50. The coupling of the TCU 80 to the TEC 104 is as described above in connection with FIG. 2.

In operation, the input signal (not shown) is as described above with respect to FIGS. 1 to 3, and propagates through the optical fibre 16 to the input port 14 of the AWG 12. The input signal is the multiplexed signal comprising N channels respectively corresponding to the N wavelengths ($\lambda_1, \ldots, \lambda_N$). However, in this second embodiment, the channels adjacent the second channel CH2 are sacrificed and do not bear any signals normally, i.e. the first and third channels CH1, CH3 do not carry any WDM components.

As previously described, the AWG 12 spatially separates out the multiplexed signal into its component channels so as to present the N channels to the respective N output ports; to this end, the second channel CH2 is presented to the second output port 20 of the AWG 12. As no WDM components are present in the input signal for the first and third channels CH1, CH3, no signals are carried by the first and third channels CH1, CH3 when there is no cross-talk.

Consequently, in an absence of wavelength drift, a second optical output signal corresponding to the second channel CH2 propagates through the second output optical fibre 34. A portion of the second optical output signal is tapped by the second 90/10 splitter and propagates through the second branch optical fibre 36 so as to be incident upon the second photodetector arrangement whereupon the portion of the second output optical signal is converted into the second voltage signal 'B'.

When wavelength drift is present in a first direction, the first output optical signal substantially only comprises cross-talk from the second channel CH2 and propagates through the first output optical fibre 24 so as to be incident upon the first photodetector arrangement whereupon the first output optical signal is converted into an amplified first voltage signal 'A'.

Alternatively, when wavelength drift is present in a second direction, the third output optical signal substantially only comprises cross-talk from the second channel CH2 and propagates through the third output optical fibre 42 so as to be incident upon the third photodetector arrangement whereupon the third output optical signal is converted into an amplified third voltage signal 'C'.

The first voltage signal A generated as a result of cross-talk from the second channel CH2 in the first direction is applied to the first terminal 78 of the TCU 80 and no signal is applied to the third terminal 98 of the TCU 80. Alternatively, in the presence of cross-talk from the second channel CH2 in the second direction the third voltage signal C is applied to the third terminal 98 of the TCU 80 and no signal is applied to the first terminal 78. The presence of either the first voltage signal A or the third voltage signal C respectively at the first and second terminals 78, 98 constitutes an indication of the direction of cross-talk/wavelength drift. In response to the indication of the direction of the wavelength drift, the TCU 80 applies a voltage across the TEC 104 so as to initiate a cooling or heating of the AWG 12 by the TEC 104 so as to reduce the temperature of the AWG 12 and thus eliminate cross-talk.

The invention claimed is:

1. A method of detecting the presence of cross-talk between adjacent channels in a communication system, the method comprising the steps of:

receiving at least a portion of a first signal on a first channel;

receiving at least a portion of a second signal on a second channel, the second channel being on a frequency adjacent the frequency of the first channel;

detecting whether cross-talk is present between the first and second channels by processing at least the portions of the first and second signals with combinatorial logic;

monitoring at least a portion of a third signal on a third channel so as to detect cross-talk on the third channel, the third channel also being at a frequency adjacent the frequency of the second channel;

detecting the direction of the frequency drift of the second channel toward one of the first and third channels by processing at least the portions of first, second and third signals with combinatorial logic.

2. A method as claimed in claim 1 further comprising the step of:

generating the first, second and third signals using a wavelength separating device.

3. A method as claimed in claim 1, wherein the combinatorial logic compares the at least portion of the first signal with the at feast portion of the second signal and wherein the combinatorial logic compares the at least portion of the second signal with the at least portion of the third signal.

4. A method as claimed in claim 1, further comprising applying a mask to the at least portion of the first channel, the second signal being the mask, application of the mask resulting in a commonality signal indicative, at a given time, of any component of the first signal having the same logic level as the second signal.

5. A method as claimed in claim 4 further comprising the step of:

determining the presence of the second signal in the commonality signal by comparing the commonality signal with the second signal.

6. A method of controlling the temperature of a wavelength separating device, comprising the steps of detecting the presence of cross-talk between adjacent channels as claimed in claim 1, and controlling the temperature of the device by responding to the detecting step.

7. A cross-talk detection apparatus for a device, the apparatus comprising a first input corresponding to a first channel of the device and a second input corresponding to a second channel of the device, the first channel being at a frequency adjacent the second channel;

further including a third input corresponding to a third channel at a third frequency adjacent the frequency of the second channel so the second frequency is between the first and third frequencies; and a combinational logic unit arranged to be coupled to the first, second and third inputs for processing signals resulting from the first, second, and third channels, the logic unit being arranged to process the first, second, and third inputs for driving indications of the presence and absence of cross-talk between the first, second, and third channels and the direction of a wavelength drift.

8. An apparatus as claimed in claim 7, wherein the device is a wavelength separating device.

9. An apparatus as claimed in claim 7, wherein the combinatorial logic unit comprises at least one logic gate, the at least one logic gate operating according to Boolean logic.

10. The combination of claim 9, wherein a controller includes a temperature controller for the first, second, and third channels, the temperature controller being arranged to be responsive to the indications.

11. The apparatus of claim 10, further in combination with a communication system including the first second and third channels, and a controller connected to be responsive to the indications for controlling the channels to minimize cross-talk between them.

12. The apparatus of claim 7, further in combination with a communication system including the first, second, and third channels, and a controller connected to be responsive to the indications for controlling the channels to minimize cross-talk between them.

13. The combination of claim 7, wherein the controller includes a temperature controller for the first, second and third channels, the temperature controller being arranged to be responsive to the indications.

14. A control loop for detecting the presence of cross-talk between adjacent channels in a communication system, the loop comprising:

a receiver arrangement for receiving at least a portion of a first signal on a first channel, at least a portion of a second signal on a second channel, the second channel being adjacent the first channel, for receiving at least a portion of a third signal on a third channel having a frequency adjacent the second channel so the second frequency is between the first and third frequencies; and a combinatorial logic unit being arranged for processing the at least portions of the first, second and third signals, for deriving indications of the presence and absence of cross-talk between the second channel and each of the first and third channels and the direction of a wavelength drift.

15. The loop as claimed in claim 14, further comprising a temperature controller for the channels connected to be responsive to the indications.

* * * * *